United States Patent
Imai et al.

(10) Patent No.: US 6,526,016 B1
(45) Date of Patent: Feb. 25, 2003

(54) TRANSPORT MECHANISM FOR OPTICAL DISC CARTRIDGE

(75) Inventors: Teruaki Imai, Nagano (JP); Takafumi Suwa, Tanashi (JP); Shoji Tomioka, Sagamihara (JP); Takahiro Asano, Hachiouji (JP); Yasushi Kuroda, Machida (JP); Hisanori Togawa, Sagamihara (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/486,906

(22) PCT Filed: Aug. 18, 1998

(86) PCT No.: PCT/JP98/03658

§ 371 (c)(1),
(2), (4) Date: Mar. 2, 2000

(87) PCT Pub. No.: WO99/12162

PCT Pub. Date: Mar. 11, 1999

(30) Foreign Application Priority Data

Sep. 2, 1997 (JP) .............................. 9-252806
Sep. 9, 1997 (JP) .............................. 9-260946

(51) Int. Cl.$^7$ .............................................. G11B 17/04
(52) U.S. Cl. ................................................. 369/77.2
(58) Field of Search ................................ 369/77.2, 77.1, 369/75.1, 75.2; 360/99.01, 99.02, 99.03, 99.04, 99.06, 99.07, 99.08, 99.09

(56) References Cited

U.S. PATENT DOCUMENTS

| 4,918,553 | A | * | 4/1990 | Suzuki et al. ............ 360/99.06 |
| 5,144,612 | A | * | 9/1992 | Isobe et al. ................ 369/77.1 |
| 5,220,552 | A | * | 6/1993 | Yokoi et al. ............... 369/77.2 |
| 5,274,620 | A | * | 12/1993 | Sipos ......................... 369/77.2 |
| 5,724,210 | A | * | 3/1998 | Sawada .................. 360/99.02 |
| 5,999,366 | A | * | 12/1999 | Shiraishi et al. ......... 360/99.09 |

FOREIGN PATENT DOCUMENTS

| JP | 1-235063 | | 9/1989 |
| JP | 3-245356 | | 10/1991 |
| JP | 7-192369 | | 7/1995 |
| JP | 8-147835 | * | 6/1996 |
| JP | 8-235734 | * | 9/1996 |
| JP | 11-086405 | * | 3/1999 |
| JP | 11-086406 | * | 3/1999 |
| JP | 11-282968 | * | 10/1999 |

OTHER PUBLICATIONS

International Search Report dated Nov. 6, 1998.

* cited by examiner

*Primary Examiner*—David Davis
*Assistant Examiner*—Tianjie Chen
(74) *Attorney, Agent, or Firm*—Eric J. Robinson; Robinson Intellectual Property Law Office, P.C.

(57) ABSTRACT

A transport mechanism for an optical disc cartridge capable of discharging an optical disc cartridge to a predetermined position by making a transport roller in pressure contact with the optical disc cartridge even if the cartridge is erroneously inserted. A guide arm is rotatively mounted which projects into an optical disc cartridge transport path between the transport roller and a disc insertion port. If the optical disc cartridge is inserted in a normal orientation, the guide arm is rotated by the optical disc cartridge to rotate the arm in the clockwise direction to allow the optical disc cartridge to be inserted, whereas if the optical disc cartridge is inserted in an orientation rotated by 90° from the normal orientation, the transport roller is made in pressure contact with the side wall of the optical disc cartridge.

6 Claims, 7 Drawing Sheets

TRANSPORT MECHANISM FOR OPTICAL DISC CARTRIDGE

BACKGROUND OF THE INVENTION

1. Field of the Invention

The present invention relates to an optical disc recording/reproducing apparatus, and more particularly to a transport mechanism for loading or unloading an optical disc cartridge which accommodates an optical disc or a mini disc.

The present invention also relates to an optical disc recording/reproducing apparatus, and more particularly to an insert and discharge mechanism for loading or unloading an optical disc cartridge which accommodates an optical disc or a mini disc.

2. Description of the Related Art

Figure 10:
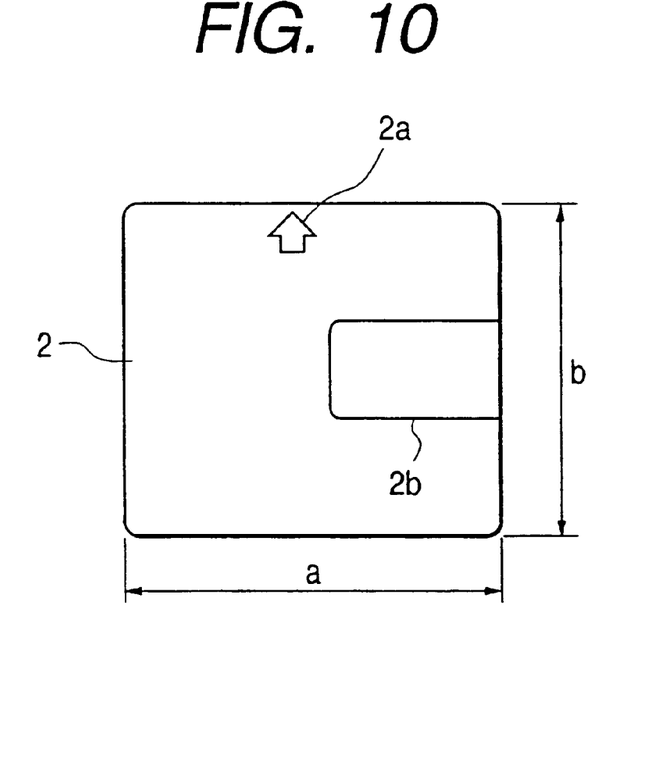
FIG. 10 is a plan view showing an optical disc cartridge used by a disc reproduction apparatus embodying the invention.
Figure 11:
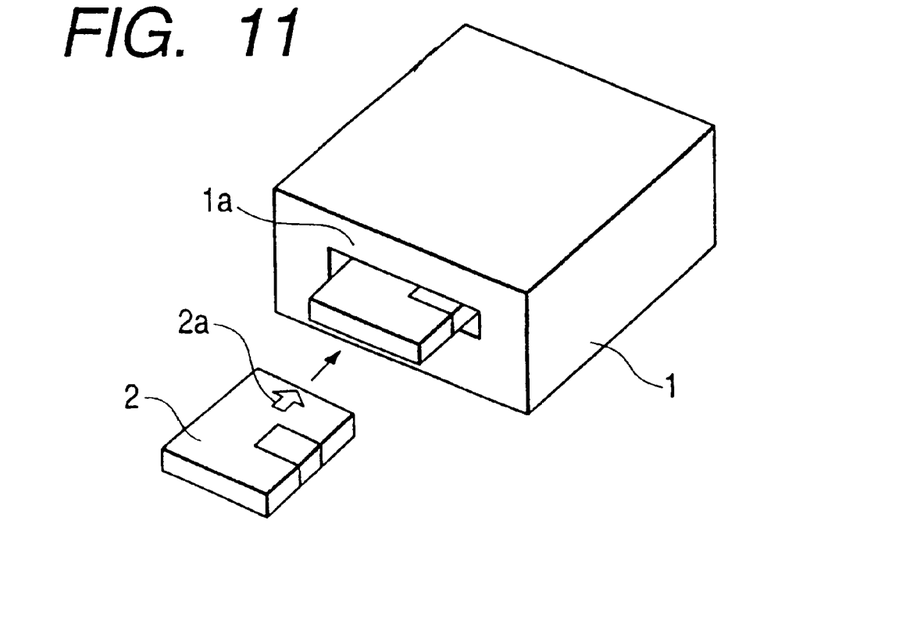
FIG. 11 is a perspective view of a disc reproduction apparatus for recording/reproducing data to and from an optical disc accommodated in a cartridge.

An optical disc cartridge accommodating an optical disc or a mini disc is shown in FIG. 10. This optical disc cartridge is provided with a shutter 2b for covering a disc recording/reproducing opening and an insertion direction mark 2a. As shown in FIG. 11, the optical disc cartridge 2 is inserted into an insertion port 1a of an optical disc reproduction apparatus 1 along a direction indicated by an arrow of an insertion direction mark 2a. The lateral width a of the optical disc cartridge 2 shown in FIG. 10 along the insertion direction is longer by 4 mm than the length b along the insertion direction.

Figure 12:
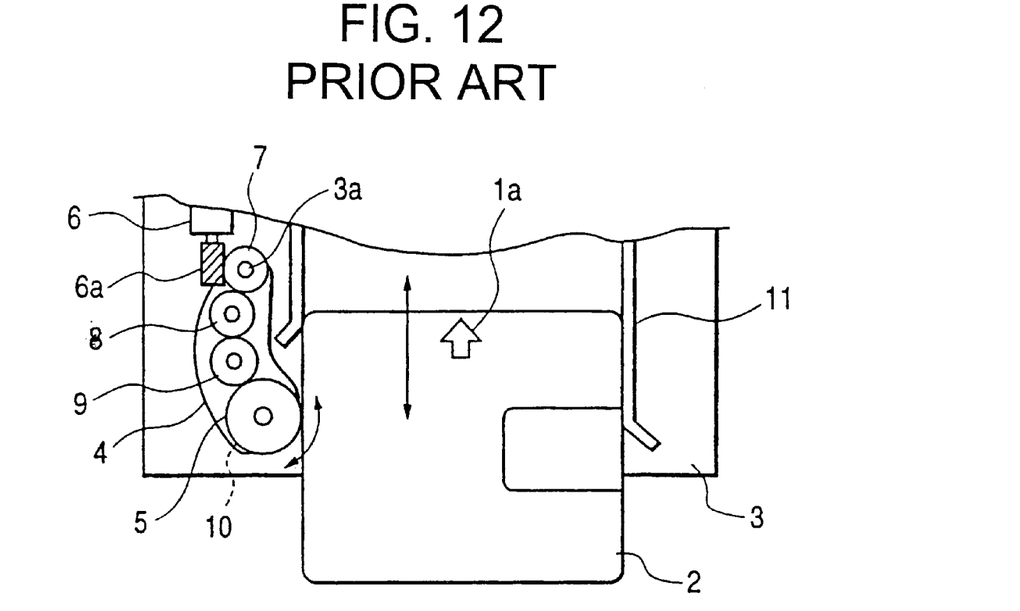
FIG. 12 is a plan view showing an example of a conventional optical disc cartridge transport mechanism.
Figure 13:
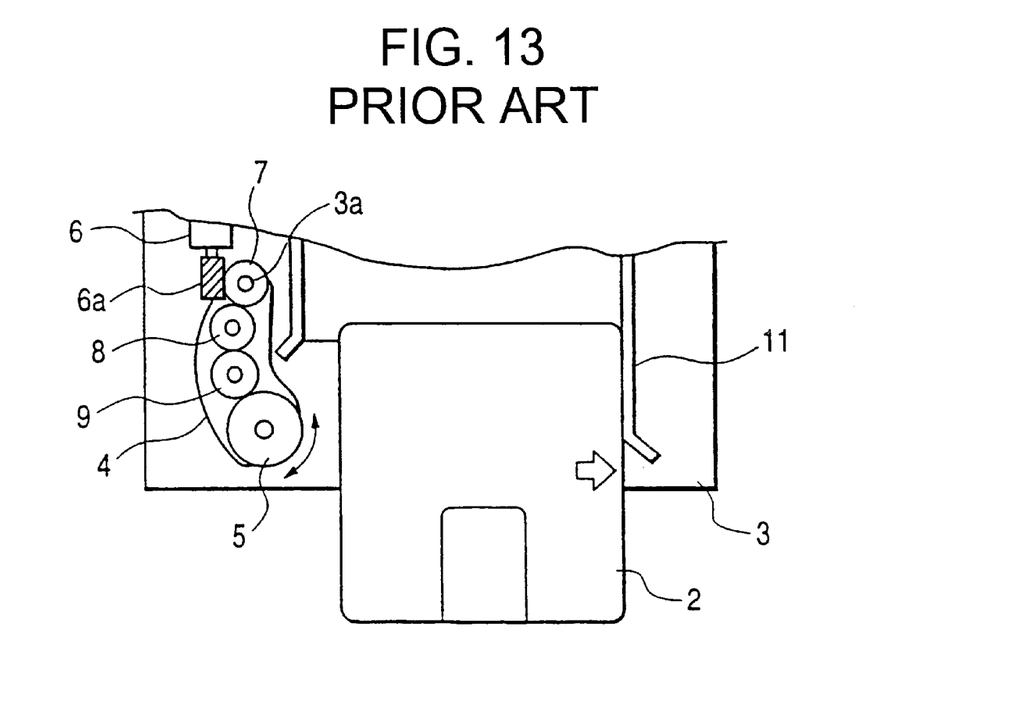
FIG. 13 is a plan view showing another state of the conventional optical disc cartridge transport mechanism shown in FIG. 12.

An example of a conventional transport mechanism for an optical disc cartridge is shown in FIGS. 12 and 13. In FIGS. 12 and 13, an arm 4 is rotatively supported by a chassis 3 via a shaft 3a mounted upright on the chassis 3, and rotatively supports a transport roller 5. The arm 4 is energized with an unrepresented spring in the counter-clockwise direction to be made in pressure contact with an unrepresented stopper. In this state, a distance between the transport roller 5 and a guide 11 is shorter than the lateral width a of the optical disc cartridge 2 shown in FIG. 10 and longer than the insertion direction length b.

A helical gear 7 rotatively supported by the shaft 3a engages with a worm gear 6a fixed to a rotary shaft of a motor 6 mounted on the chassis 3. The helical gear 7 is sequentially engaged with idler gears 8 and 9 and a gear 10 integral with the transport roller 5, respectively and rotatively supported on the arm 4 with shafts, so that the transport roller 5 is rotated by the motor 6.

As shown in FIG. 12, as the optical disc cartridge 2 is inserted in a normal orientation, the transport roller 5 pushes the side wall of the optical disc cartridge 2 to abut it on the guide 11. Insertion of the optical disc cartridge 2 is detected with an unrepresented detector means and thereafter the motor 6 rotates so that the transport roller 5 transports the optical disc cartridge 2 to the reproduction position. After recording/reproducing, the transport roller 5 rotates in a reverse direction to discharge the optical disc cartridge 2 from the insertion port to a predetermined projection position.

As shown in FIG. 13, if the optical disc cartridge 2 is inserted in an orientation rotated by 90° from the normal orientation, the transport roller 5 cannot transport the optical disc cartridge 2 because it is spaced apart from the side wall of the optical disc cartridge 2.

With the transport mechanism for an optical disc cartridge described above, if an optical disc cartridge is inserted in an orientation rotated by 90° from the normal orientation, the cartridge is inserted into the apparatus without being squeezed with the transport roller 5 and cannot be discharged thereafter. Even if it is discharged forcibly by any means, it cannot be stopped at a normal disc discharge position and it may be fallen down from the apparatus.

If the transport roller 5 is projected deeper into a transport path of the optical disc cartridge 2 in a normal state in order to make the transport roller 5 in contact with the optical disc cartridge 2 even if it is erroneously inserted in an orientation rotated by 90° from a normal orientation, then the arm 4 is pushed by the optical disc cartridge 2 in a direction of moving the transport roller 5 toward the inner side of the transport path. Therefore, a feeling of inserting an optical disc cartridge in the normal orientation is degraded and the arm 4 or its support may be destroyed.

SUMMARY OF THE INVENTION

The present invention has been made under the above-described circumstances. It is an object of the present invention to provide a transport mechanism for an optical disc cartridge, capable of preventing a feeling of inserting an optical disc cartridge in the normal orientation from being degraded and discharging an erroneously inserted optical disc cartridge with a transport roller.

It is another object of the present invention to provide a transport mechanism for a disc cartridge, capable of driving a transport roller support with a small force.

In a transport mechanism of this invention for an optical disc cartridge for transporting an optical disc cartridge having a lateral width along an insertion direction longer than a length along the insertion direction, by energizing an arm rotatively supporting a transport roller with a spring to make the transport roller in pressure contact with a side wall of the optical disc cartridge and by rotating the transport roller, a rotative guide arm is provided which projects into an optical disc cartridge transport path between the transport roller and a disc insertion port, if the optical disc cartridge is inserted in a normal orientation, the guide arm is rotated by the optical disc cartridge to rotate the arm in a direction of retracting the transport roller from the optical disc cartridge transport path to allow the optical disc cartridge to be inserted, and if the optical disc cartridge is inserted in an orientation rotated by 90° from the normal orientation, the transport roller is made in pressure contact with the side wall of the optical disc cartridge.

In a transport mechanism of this invention for an optical disc cartridge for transporting the optical disc cartridge by making a transport roller in pressure contact with the optical disc cartridge with a force of a spring and rotating the transport roller, the force of the spring is applied to a driving unit for a transport roller support only when the transport roller is made in pressure contact with the optical disc cartridge.

In the transport mechanism of the invention for an optical disc cartridge, a first arm is rotatively supported by a chassis and energized to rotate with a first spring and make a contact portion of the first arm in pressure contact with a contact portion of the chassis, a second arm is rotatively supported relative to the first arm and energized to rotate relative to the first arm with a second spring and make a contact portion of the second arm in pressure contact with a contact portion of the first arm, the transport roller is rotatively supported by the second arm, and an operation member pushes the first arm to rotate the first and second arms to make the transport roller in pressure contact with the optical disc cartridge with a force of the second spring.

In the transport mechanism of the invention for an optical disc cartridge, a first arm is rotatively supported by a chassis, a second arm is rotatively supported relative to the first arm and energized to rotate relative to the first arm with a spring and make a contact portion of the second arm in pressure contact with a contact portion of the first arm, the transport roller is rotatively supported by the second arm, and an operation member pushes the first arm to rotate the first and second arms to make the transport roller in pressure contact with the optical disc cartridge with a force of the spring.

DETAILED DESCRIPTION OF THE PREFERRED EMBODIMENTS

Figure 1:
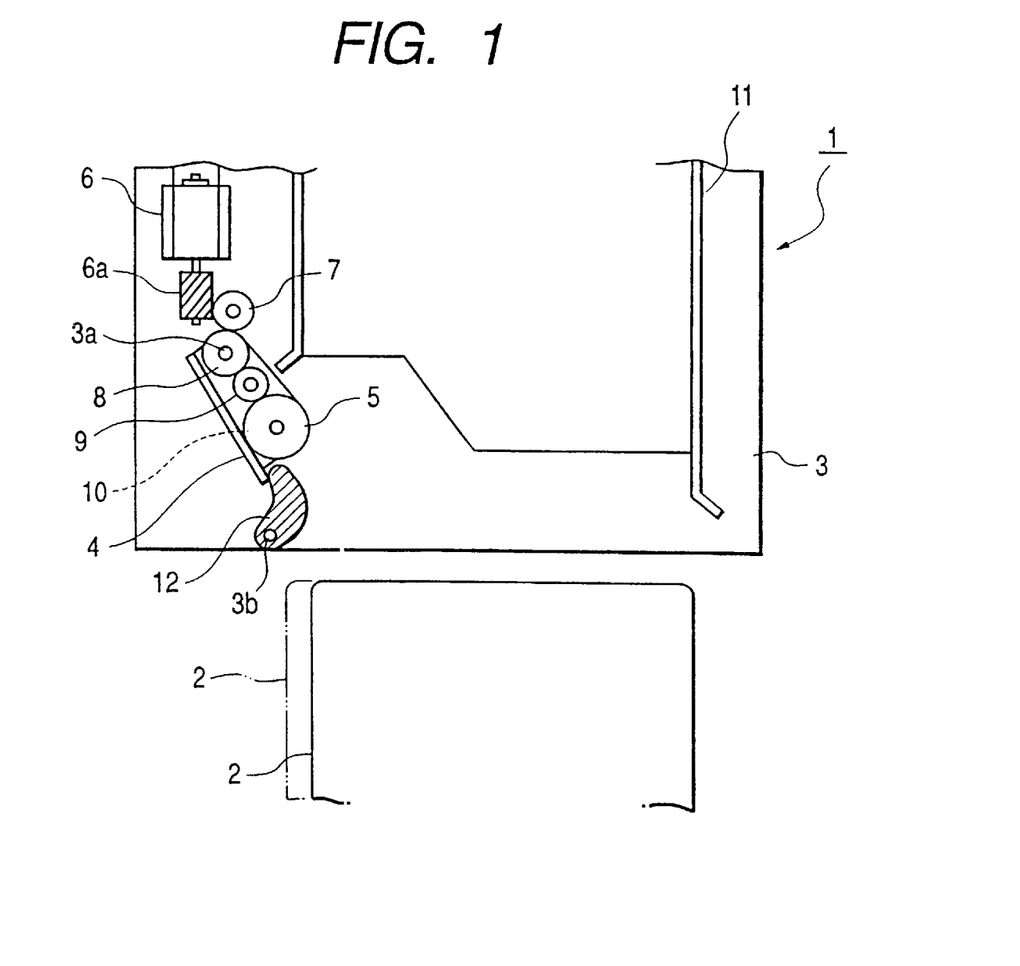
FIG. 1 is a plan view showing a transport mechanism for an optical disc cartridge according to an embodiment of the invention.

An embodiment of the invention will be described with reference to the accompanying drawings. FIG. 1 shows a transport mechanism for an optical disc cartridge according to the embodiment of the invention. In FIG. 1, an arm 4 is rotatively supported by a shaft 3a mounted upright on a chassis 3 and rotatively supports a transport roller 5. The arm 4 is energized with an unrepresented spring in the counter-clockwise direction to be made in pressure contact with an unrepresented stopper. In this state, a distance between the transport roller 5 and a guide 11 is shorter than a width b of the optical disc cartridge 2 shown in FIG. 10 inserted in an erroneous orientation.

A helical gear 7 rotatively supported by the shaft 3a mounted upright on the chassis 3 engages with a worm gear 6a fixed to a rotary shaft of a motor 6 mounted on the chassis 3. The helical gear 7 is sequentially engaged with idler gears 8 and 9 and a gear 10 integral with the transport roller 5, respectively and rotatively supported on the arm 4 with shafts, so that the transport roller 5 is rotated by the motor 6.

A guide arm 12 is rotatively supported by a shaft 3b mounted upright on the chassis 3 and can freely move between a position at which the guide arm 12 abuts on the arm 4 and a position at which the guide arm 12 projects into a transport path of the optical disc cartridge. In FIG. 1, a normal insertion state of the optical disc cartridge is shown by a two-dot chain line, whereas an insertion state rotated by 90° from a normal insertion state is shown by a solid line.

Figure 2:
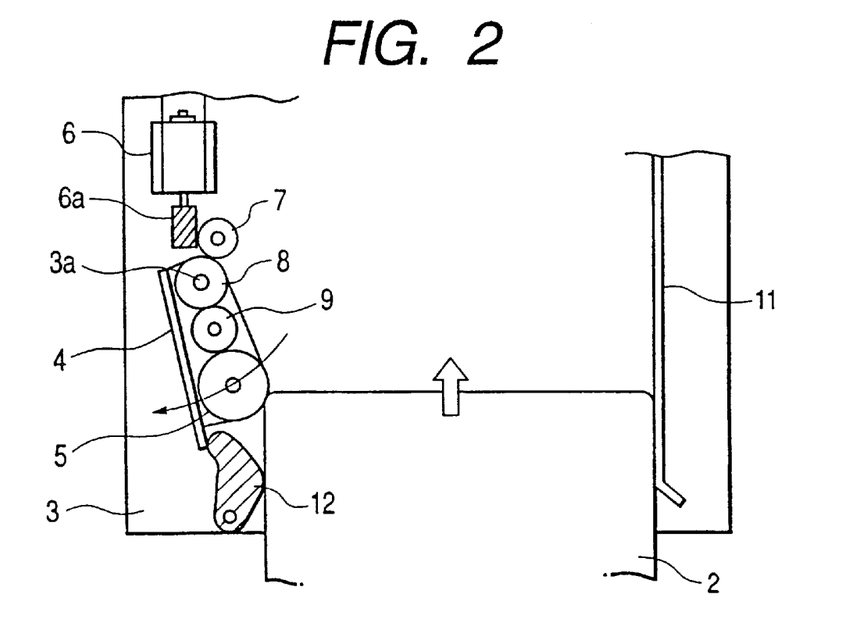
FIG. 2 is a plan view showing an operation state of the transport mechanism for an optical disc cartridge shown in FIG. 1.

As shown in FIG. 2, as the optical disc cartridge 2 is inserted in a normal orientation, the optical disc cartridge 2 pushes the guide arm 12 to rotate it in the counter-clockwise direction. The guide arm 12 rotates the arm 4 in the clockwise direction. When the optical disc cartridge 2 abuts on the transport roller 5, the arm 4 receives a rotation force in the clockwise direction from the transport roller 5, so that a feeling of inserting an optical disc cartridge is not degraded.

The transport roller 5 pushes the side wall of the optical disc cartridge 2 to abut it on the guide 11. Insertion of the optical disc cartridge 2 is detected with an unrepresented detector means, and thereafter the motor 6 rotates so that the transport roller 5 transports the optical disc cartridge 2 to the reproduction position. After recording/reproducing, the transport roller 5 rotates in a reverse direction to discharge the optical disc cartridge 2 from the insertion port to a predetermined projection position.

Figure 3:
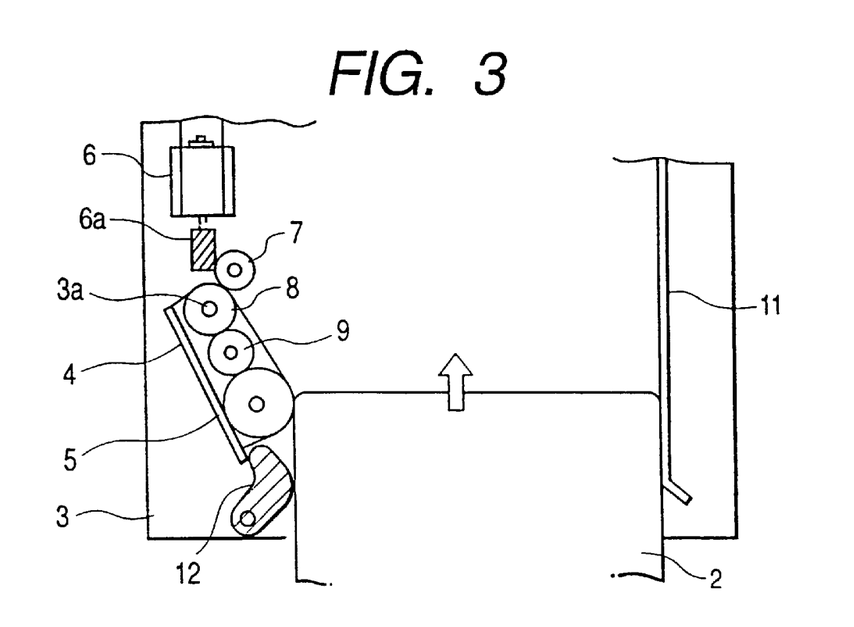
FIG. 3 is a plan view showing another operation state of the transport mechanism for an optical disc cartridge shown in FIG. 1.

As shown in FIG. 3, if the optical disc cartridge 2 is inserted in an orientation rotated by 90° from the normal orientation, the guide arm 12 will not rotate the arm 4 so that the transport roller 5 is made in pressure contact with the side wall of the optical disc cartridge 2.

Insertion of the optical disc cartridge 2 is detected with an unrepresented detector means, and thereafter the motor 6 rotates so that the transport roller 5 transports the optical disc cartridge 2 to the reproduction position. This erroneous insertion is detected with an unrepresented erroneous insertion detector means. The transport roller 5 is rotated in the reverse direction to discharge the optical disc cartridge 2 from the insertion port to the predetermined projection position. Therefore, the optical disc cartridge 2 can be discharged reliably from the apparatus.

The invention is not limited to the above embodiment. For example, erroneous insertion of the optical disc cartridge 1 may be detected in accordance with no rotation of the arm 4 and this erroneous insertion may be displayed on a display device.

According to the transport mechanism for an optical disc cartridge of this invention, even if an optical disc cartridge is erroneously inserted, the transport roller is made in pressure contact with the optical disc cartridge. It is therefore possible to discharge the optical disc cartridge to the predetermined projection position. Upon detection of an erroneous insertion at the reproduction position, the optical disc cartridge is discharged to the predetermined projection position so that it is possible to prevent the optical disc cartridge from being fallen down from the apparatus.

Furthermore, as the optical disc cartridge is inserted in a normal orientation, the arm 4 supporting the transport roller is not pushed by the optical disc cartridge 2 in a direction of moving the transport roller 5 toward the inner side of the transport path. Therefore, a feeling of inserting an optical disc cartridge in the normal orientation is not degraded and the arm or its support is not destroyed.

Figure 4:
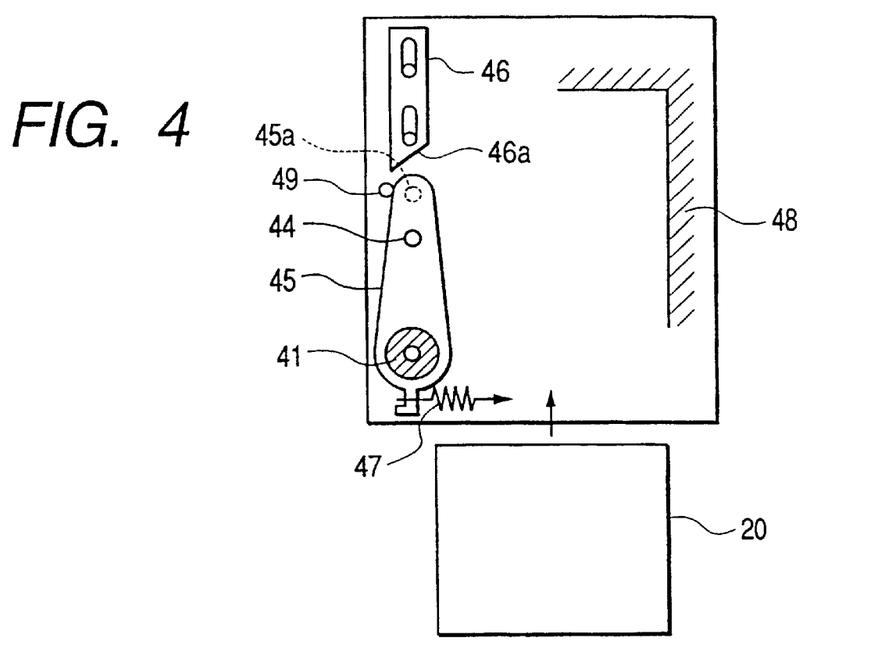
FIG. 4 is a plan view showing an example of an insert and discharge mechanism for an optical disc cartridge usable for the transport mechanism shown in FIG. 1.
Figure 5:
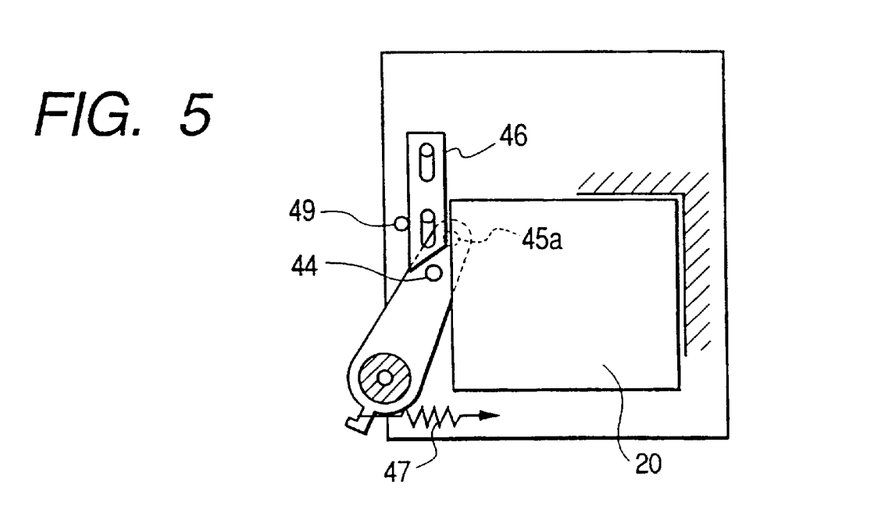
FIG. 5 is a plan view showing a different state of an insert and discharge mechanism for an optical disc cartridge shown in FIG. 5.

An example of a an insert and discharge mechanism for an optical disc cartridge usable as the transport mechanism described above will be described with reference to FIGS. 4 and 5. FIG. 4 shows a loading standby state of an optical disc cartridge 20, and FIG. 5 shows a state that the optical disc cartridge 20 is loaded at a reproduction position. An arm 45 shown in FIGS. 4 and 5 has a shaft 44 rotatively mounted on a chassis and rotatively supporting a transport roller 41. The transport roller 41 is rotated by an unrepresented driving mechanism.

A tension coil spring 47 extended between the chassis and the arm 45 energizes the arm 45 in the counter-clockwise direction as seen in FIGS. 4 and 5. As shown in FIG. 4, in the loading standby state of the optical disc cartridge 20, the arm 45 is in pressure contact with a shaft 49 mounted upright on the chassis.

In this state, as the optical disc cartridge 20 is inserted between a guide 48 and the transport roller 41 along a direction indicated by an arrow in FIG. 4, the transport roller 41 is pushed by the optical disc cartridge 20 so that the arm 45 is rotated in the clockwise direction against the spring force of the tension coil spring 47.

During loading, the transport roller 41 becomes in pressure contact with the optical disc cartridge 20 by the force of the tension coil spring 47. When insertion of the optical disc cartridge 20 is detected with a detector means, the transport roller 41 is rotated in the counter-clockwise direction and the optical disc cartridge 20 is transported to the reproduction position.

When it is detected that the optical disc cartridge 20 is transported to the reproduction position of a reproducing unit, the transport roller 41 is stopped and a slider 46 is moved to a position shown in FIG. 5 by an unrepresented driving mechanism.

A slanted portion 46a of the slider 46 pushes a shaft 45a of the arm 45 so that the arm 45 rotates and the transport roller 41 detaches from the optical disc cartridge 20. A floating lock of the reproducing unit is also released so that the reproducing unit is supported in a floating state with springs and dampers to start recording/reproducing data to and from the optical disc. Discharging the optical disc cartridge after the recording/reproducing is performed by the operations reversing the above operations.

The transport roller 41 is required to be spaced apart from the optical disc cartridge 20 by a predetermined distance during the reproduction state, in order to retain a floating stroke of the optical disc cartridge 20. Therefore, the tension coil spring 47 of the mechanism shown in FIGS. 4 and 5 required to be deformed more than the pressure contact state of the transport roller 41 with the optical disc cartridge 20, which results in a large force of the tension coil spring 47.

In order to give a sufficient pressure force for transporting the optical disc cartridge 20, the spring constant of the tension coil spring 47 is required to be large. A drive force for the slider 46 is also required to be large.

A large force is always required to be applied to the slider 46 always while the optical disc cartridge 20 is loaded at the reproduction position. The driving mechanism for the arm 45 of an insert and discharge transport mechanism for an optical disc cartridge becomes bulky and a necessary space therefor also becomes large, resulting in high cost in some case.

Figure 6:
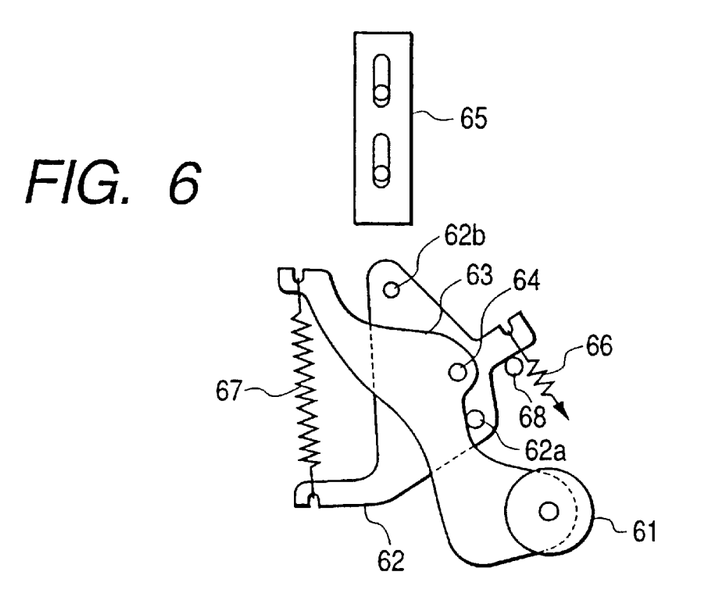
FIG. 6 is a plan view showing an insert and discharge mechanism for an optical disc cartridge according to an embodiment different from the transport mechanism shown in FIG. 4.
Figure 7:
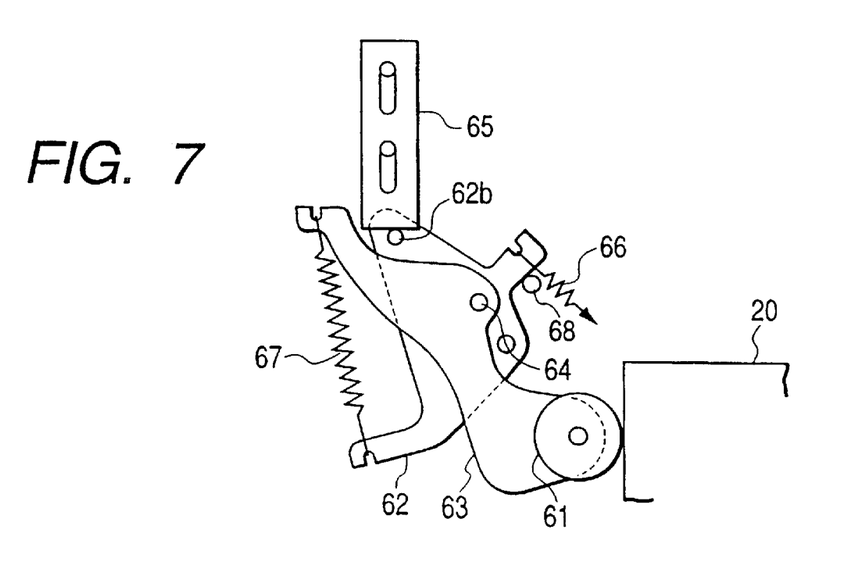
FIG. 7 is a plan view showing a different state of an insert and discharge mechanism for an optical disc cartridge shown in FIG. 6.

Another embodiment free from this problem will be described next with reference to the accompanying drawings. FIGS. 6 and 7 show an insert and discharge mechanism for an optical disc cartridge according to an embodiment different from the mechanism shown in FIG. 4. FIG. 6 shows a state that an optical disc cartridge is loaded at the reproduction position, and FIG. 7 shows a transport state of the optical disc cartridge 20. A guide for the optical disc cartridge 20 under the transport and a reproducing unit respectively not shown in FIGS. 6 and 7 are the same as those shown in FIGS. 4 and 5, and the description of the operations thereof is omitted. First and second arms 62 and 63 shown in FIGS. 6 and 7 are rotatively supported by a shaft 64 mounted upright on a chassis.

A first tension coil spring 66 extended between the first arm 62 and the chassis energizes the first arm 62 in the clockwise direction. In the state shown in FIG. 6 wherein the optical disc cartridge is loaded at the reproduction position, the first arm 62 is in pressure contact with a shaft 68 mounted upright on the chassis.

A second tension coil spring 67 extended between the first arm 62 and second the arm 63 energizes the first arm 62 in the clockwise direction and the second arm 63 in the counter-clockwise direction. In the state shown in FIG. 6, the second arm 63 is in pressure contact with a shaft 62a mounted upright on the chassis.

A transport roller 61 rotatively supported by the second arm 63 and rotated by an unrepresented driving mechanism is spaced apart from the optical disc cartridge loaded at the reproduction position by a distance allowing the floating stroke to be retained.

As shown in FIG. 7, when the optical disc cartridge 20 is transported, a slider 65 driven with an unrepresented driving mechanism pushes a shaft 62b mounted upright on the first arm 62 which in turn rotates in the counter-clockwise direction.

Although the second arm 63 is rotated in the same direction as the first arm, while the transport roller 61 is in pressure contact with the optical disc cartridge 20, rotation of the second arm 63 is stopped and the force of the tension coil spring 67 functions to press the transport roller 61 against the optical disc cartridge.

With the structure described above, it is sufficient for the first tension coil spring 66 to apply a force to maintain the first and second arms 62 and 63 at their home positions in a state wherein no load is applied to the transport roller 61. Therefore, the first tension coil spring 66 may be a spring having a low spring constant. In most of a stroke of the slider 65, the slider 65 rotates the first arm 62 against the force of the first tension coil spring 66 having a small load.

When the transport roller 61 is made in pressure contact with the optical disc cartridge 20 at the reproduction position, although the force of the first tension coil spring 66 acts upon the slider 65, a force for driving the slider 65 can be made small because the stroke for making the transport roller 61 in pressure contact with the optical disc cartridge 20 is small and by properly setting the position of the shaft 62b which is a force application point of the slider 65.

It is not necessary to deform the spring for making the transport roller in pressure contact more than the pressure contact state of the transport roller, as in the mechanism shown in FIGS. 4 and 5. As described above, the driving mechanism for the slider 65 can be made smaller than the mechanism shown in FIGS. 4 and 5, because a load of the mechanism is small.

Figure 8:
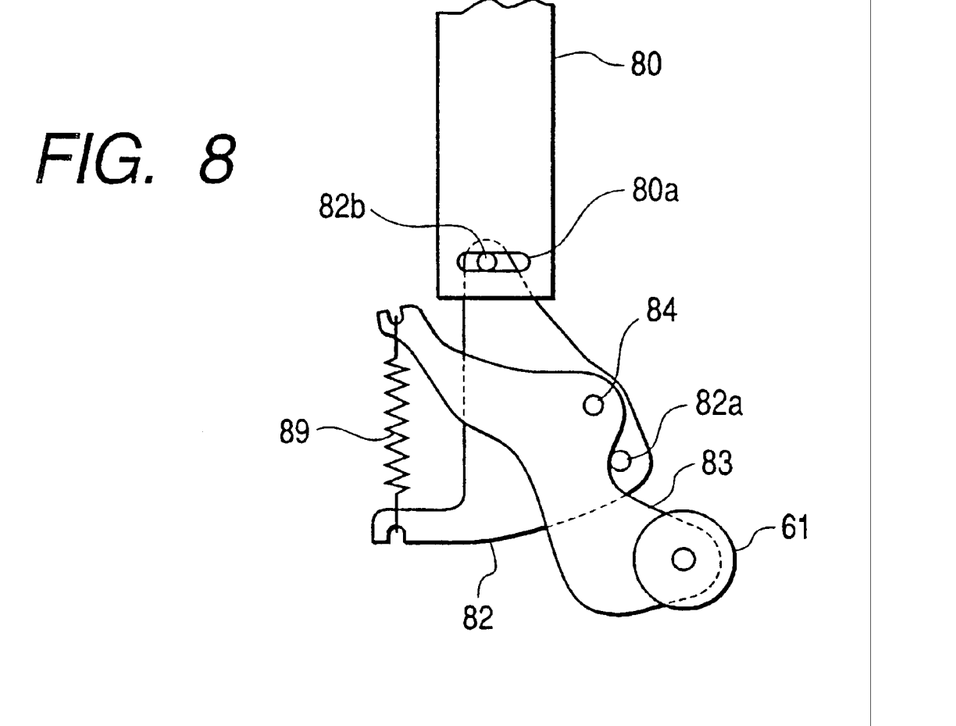
FIG. 8 is a plan view showing a transport mechanism for an optical disc cartridge according to an embodiment different from an insert and discharge mechanism shown in FIG. 4.

FIG. 8 shows an insert and discharge mechanism for an optical disc cartridge according to an embodiment different from the mechanism shown in FIG. 4. A guide for the optical disc cartridge under the transport and a reproducing unit respectively not shown in FIG. 8 are the same as those of the mechanism described earlier with reference to FIGS. 4 and 5, and the description of the operations thereof is omitted. First and second arms 82 and 83 shown in FIG. 8 are rotatively supported by a shaft 84 mounted upright on a chassis.

A tension coil spring 89 extended between the first arm 82 and the second arm 83 energizes the first arm 82 in the clockwise direction and the second arm 83 in the counter-clockwise direction. The second arm 83 is normally in pressure contact with a shaft 82*a* mounted upright on the first arm 82.

A transport roller 61 rotatively supported by the second arm 82 is rotated by an unrepresented driving mechanism. A shaft 82*b* mounted upright on the first arm 82 is inserted into an elongated hole 80*a* formed in a slider 80 driven with an unrepresented driving mechanism. The slider 80 rotates the first arm 82.

When an optical disc cartridge is loaded at the reproduction position, the slider 80 moves upward as viewed in FIG. 8, the first and second arms 82 and 83 are rotated in the clockwise direction, and the transport roller 61 is spaced apart from the optical disc cartridge by a distance allowing the floating stroke of the optical disc cartridge to be retained.

When the optical disc cartridge is transported, the slider 80 driven is moved downward as viewed in FIG. 8. Although the first and second arms 82 and 83 are rotated in the counter-clockwise direction, rotation of the second arm 83 is stopped while the transport roller 61 is in pressure contact with the optical disc cartridge 20. Therefore, the force of the tension coil spring 89 functions to press the transport roller 61 against the optical disc cartridge.

With the structure described above, when the transport roller 61 is made in pressure contact with the optical disc cartridge at the reproduction position, although the force of the tension coil spring 89 acts upon the slider 80, a force for driving the slider 80 can be made small because the stroke for making the transport roller 61 in pressure contact with the optical disc cartridge is small and by properly setting the position of the shaft 82*b* which is a force application point of the slider 80.

It is not necessary to deform the spring for making the transport roller in pressure contact more than the pressure contact state of the transport roller, as in the mechanism shown in FIGS. 4 and 5. As described above, the driving mechanism for the slider 80 can be made smaller than the mechanism shown in FIGS. 4 and 5 because a load of the mechanism is small.

Figure 9:
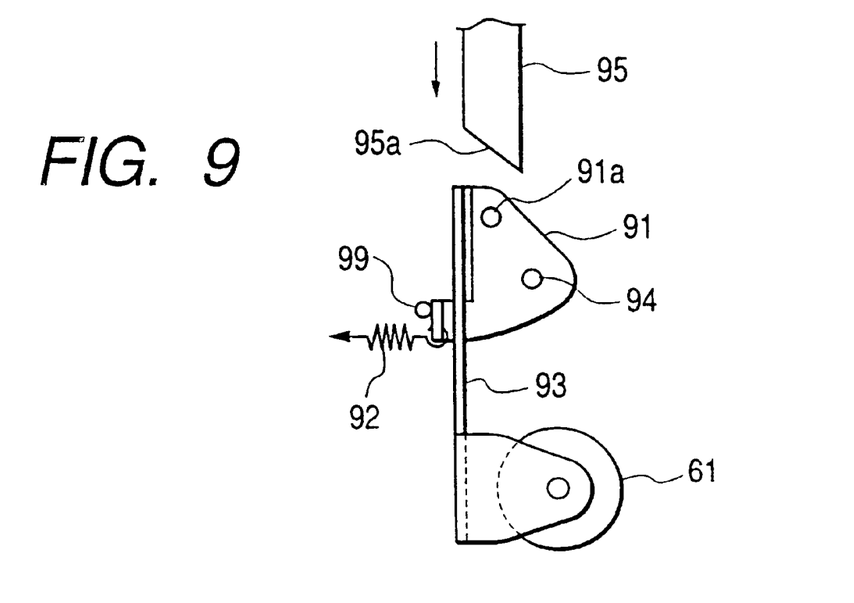
FIG. 9 is a plan view showing a transport mechanism for an optical disc cartridge according to an embodiment different from an insert and discharge mechanism shown in FIG. 4.

FIG. 9 shows an insert and discharge mechanism for an optical disc cartridge according to an embodiment different from the mechanism shown in FIG. 4. A guide for the optical disc cartridge under the transport and a reproducing unit respectively not shown in FIG. 9 are the same as those of the mechanism described earlier with reference to FIGS. 4 and 5, and the description of the operations thereof is omitted. An arm 91 shown in FIG. 9 is rotatively supported by a chassis via a shaft 94 mounted upright on the chassis.

A tension coil spring 92 extended between the arm 91 and the chassis energizes the arm 91 in the clockwise direction. The arm 91 is normally in pressure contact with a shaft 99 mounted upright on the chassis. A plate spring 93 is fixed to the arm 91 to rotatively support the transport roller 61. The plate spring 93 may be formed integrally with the arm 91.

The transport roller 61 is rotated by an unrepresented driving mechanism. A slanted surface 95*a* of a slider 95 driven with an unrepresented driving mechanism abuts on a shaft 91*a* mounted upright on the arm 91 and rotates the arm 91 against the force of the tension coil spring 92.

When an optical disc cartridge is loaded at the reproduction position, the slider 95 moves upward as viewed in FIG. 9, the arm 91 is rotated in the clockwise direction, and the transport roller 61 is spaced apart from the optical disc cartridge by a distance allowing the floating stroke of the optical disc cartridge to be retained.

When the optical disc cartridge is transported, the slider 95 driven is moved downward as viewed in FIG. 9. Although the arm 91 and plate spring 93 are rotated in the counter-clockwise direction, motion of the tip of the plate spring 93 is stopped while the transport roller 61 is in pressure contact with the optical disc cartridge. Therefore, the plate spring 93 deflects and the force thereof functions to press the transport roller 61 against the optical disc cartridge.

With the structure described above, when the transport roller 61 is made in pressure contact with the optical disc cartridge at the reproduction position, although the force of the plate spring 93 acts upon the slider 95, it is not necessary to deform the spring for making the transport roller in pressure contact more than the pressure contact state of the transport roller, as in the mechanism shown in FIGS. 4 and 5. The driving mechanism for the slider 95 can be made smaller than the mechanism shown in FIGS. 4 and 5 because a load of the mechanism is small.

The invention is not limited to the above embodiments. For example, in the embodiments shown in FIGS. 6 and 8, the shaft for rotatively supporting the second arm may be mounted upright on the first arm.

According to an insert and discharge mechanism for an optical disc cartridge, the force of the pressure contact springs does not act upon the driving mechanism for the transport roller support during the period while the pressure contact force is not applied to the optical disc cartridge. Therefore, the driving mechanism can be driven with a small force.

It is not necessary for the pressure contact springs to be deformed more than the pressure contact state of the transport roller. Therefore, a maximum load of the driving mechanism for the transport roller support can be made smaller than a conventional drive mechanism. It is therefore possible to make small the driving mechanism and a motor for the transport roller support.

The insert and discharge mechanism for an optical disc cartridge shown in FIGS. 6 to 9, may be mounted on a conventional optical disc cartridge transport mechanism independently from the transport mechanism shown in FIGS. 1 to 3.

What is claimed is:

1. A transport mechanism for a disc cartridge for an optical disc reproduction apparatus, comprising:

transport means (5) for transporting a disc cartridge into the reproduction apparatus, said transport means having a roller for pressing the disc cartridge;

guide means (11) for transporting the disc cartridge into the reproduction apparatus in cooperation with a press force by the roller irrespective of an insertion orientation of the disc cartridge; and regulating means (12) for regulating said transport means,
  wherein said regulating means regulates a position of the roller in accordance with an insertion orientation of the disc cartridge.

2. A transport mechanism for a disc cartridge according to claim 1, wherein said regulating means regulates said transport means so that when a disc cartridge is inserted in a normal orientation, the roller pivots to a position capable of pressing and transporting the disc cartridge, and even when a disc cartridge is inserted in an orientation perpendicular to the normal orientation, the roller takes a position capable of pressing and transporting the disc cartridge.

3. A transport mechanism for a disc cartridge according to claim 2, wherein even when a disc cartridge is inserted into the reproduction apparatus in any of the normal orientation and the orientation perpendicular to the normal orientation, said regulating means regulates said transport means so that said transport means applies a proper press to the disc cartridge.

4. A transport mechanism for a disc cartridge according to claim 1, wherein the normal orientation is an orientation that a disc cartridge is inserted with its longer side being directed forward, and the orientation perpendicular to the normal orientation is an orientation that a disc cartridge is inserted with its shorter side being directed forward.

5. A transport mechanism for a disc cartridge according to claim 1, further comprising drive means for generating a drive force for transporting a disc cartridge, and transmission means for transmitting the drive force of said drive means to the roller.

6. A transport mechanism for a disc cartridge according to claim 1, wherein said regulating means is positioned between the reproduction apparatus and said transport means.

* * * * *